United States Patent [19]
Weichsel

[11] 3,744,858
[45] July 10, 1973

[54] GAS BEARINGS

[75] Inventor: Richard H. Weichsel, Hudson, Ohio

[73] Assignee: The Apex Bearings Company, Hudson, Ohio

[22] Filed: June 15, 1971

[21] Appl. No.: 153,371

[52] U.S. Cl. ................. 308/5 R, 308/9, 308/DIG. 1
[51] Int. Cl. .............................................. F16c 17/00
[58] Field of Search ............. 308/5, 9, 122, DIG. 1; 180/116–125; 269/20

[56] References Cited
UNITED STATES PATENTS

| | | | |
|---|---|---|---|
| 3,475,065 | 10/1969 | Werchsel | 308/5 R |
| 3,137,530 | 6/1964 | Kohler | 308/5 R |
| 3,484,064 | 12/1969 | Koenig, III | 308/5 R |
| 3,325,229 | 6/1967 | Webb | 308/5 R |
| 3,384,425 | 5/1968 | Brown | 308/5 R |
| 3,398,996 | 8/1968 | Wucherer | 308/9 |
| 3,015,524 | 2/1962 | Slayter et al. | 308/9 |

FOREIGN PATENTS OR APPLICATIONS

| | | | |
|---|---|---|---|
| 1,203,842 | 9/1970 | Great Britain | 308/5 |

*Primary Examiner*—Charles J. Myhre
*Assistant Examiner*—R. H. Lazarus
*Attorney*—John Mahoney

[57] ABSTRACT

A gas bearing for carrying a work load to any desired location including a circular housing having a cavity in which is arranged spaced grooves separated by ribs or lands. The bearing also has a peripheral flange which extends upwardly from the body of the housing and receives a porous plate which engages the lands and covers the grooves. Means are also provided for passing a gas ino the housing. When the bearing plate is inverted, the porous plate rests on a track or base plate and when gas passes through the porous plate, the bearing may be easily rotated or moved in a linear direction. The bearing may be of any desired size, such as from approximately one-fourth inch in diameter up to the requirement of the load to be carried in relation to the avaialbel gas supply. Two or more of the bearings may be used in tandem when the load so requires. To protect the bearing when the load is heavy, a plate which carries the work or forms part of it is provided with a counter bore which is held in spaced relation to the base plate by resilient means, such as a Bellevile washer, the lower portion of which surrounds a boss on the bearing, while work, such as shearing, stamping or forging is being performed on the load, the bottom portion of the plate surrounding the bearing is moved into engagement with the base plate. The resilient means, however, prevents the weight of the load from collapsing the bearing and this is particularly true with respect to the porous plate which is maintained intact. When the work force on the load isterminated, the resilient means again maintains the load in spaced relation to the base plate at which time the load upon which work has been performed may again be moved to any desired position.

5 Claims, 5 Drawing Figures

INVENTOR.
RICHARD H. WEICHSEL
BY
John Mahoney
ATTORNEY

GAS BEARINGS

The present invention relates to gas bearings, such as air, engine exhaust gases, or the like, and more particularly to a gas bearing which may be rotated or moved in a linear direction and which includes means associated with the bearing for protecting it from collapsing when work is being performed on a comparatively heavy load carried by the bearing.

In U.S. Pat. No. 3,475,065 granted to me on Oct. 28, 1969, a gas bearing of the single plane, linear movable type is disclosed. Such bearings include a machinable housing having a cavity therein in which a plurality of grooves are trappaned which grooves are separated by lands or ribs of substantially the same width as the grooves. The bearing also includes a plate having restrictive pores therein fitting within the cavity of the housing which engages the lands and covers the grooves and is held in place by fastening means, such as screws, extending through the housing. The housing as shown in my prior patent is also provided with a tapped opening through which a gas is passed into the grooves so that when the housing is inverted and placed upon a flat stationary base member, the gas can be passed through a substantial area of the porous plate to thereby facilitate the linear movement of the housing in opposite directions. In my previous patent, however, the bearing is limited to a linear motion that is in direct relation to the air supply available to it in proportion to the projecting inches of area of its work force. In commercial use, such bearings would be desirable if they could be used for carrying a load, such as one that would move the work into a suitable fixture for holding it in place while work is performed thereon, such as shearing, stamping, or punching.

In accordance with the present invention, resilient means associated with the housing of the bearing is provided for protecting the bearing from heavy objects supported thereon while work is being performed on the load. It is therefore not necessary to remove the load from the bearing while work is being performed thereon. My improved bearing may be moved either in a linear direction or rotated to convey the work to a desired location where it may be held in place by any suitable fixture while work is being performed thereon.

It is therefore an object of the present invention to provide resilient means arranged between a load and a bearing for protecting the bearing while work is being performed upon the load.

Another object of my invention is to provide an improved gas bearing for conveying a comparatively heavy load or a work plate carrying such a load to a desired location where it may be held in place by any suitable means, such as a press, while work, such as shearing, stamping, punching or forging is being performed thereon, without removing the work for the bearing and in which resilient means are provided for preventing collapse of the bearing and particularly the porous plate during such operations.

My invention will be better understood by reference to the accompanying drawings in which.

Figure 4:
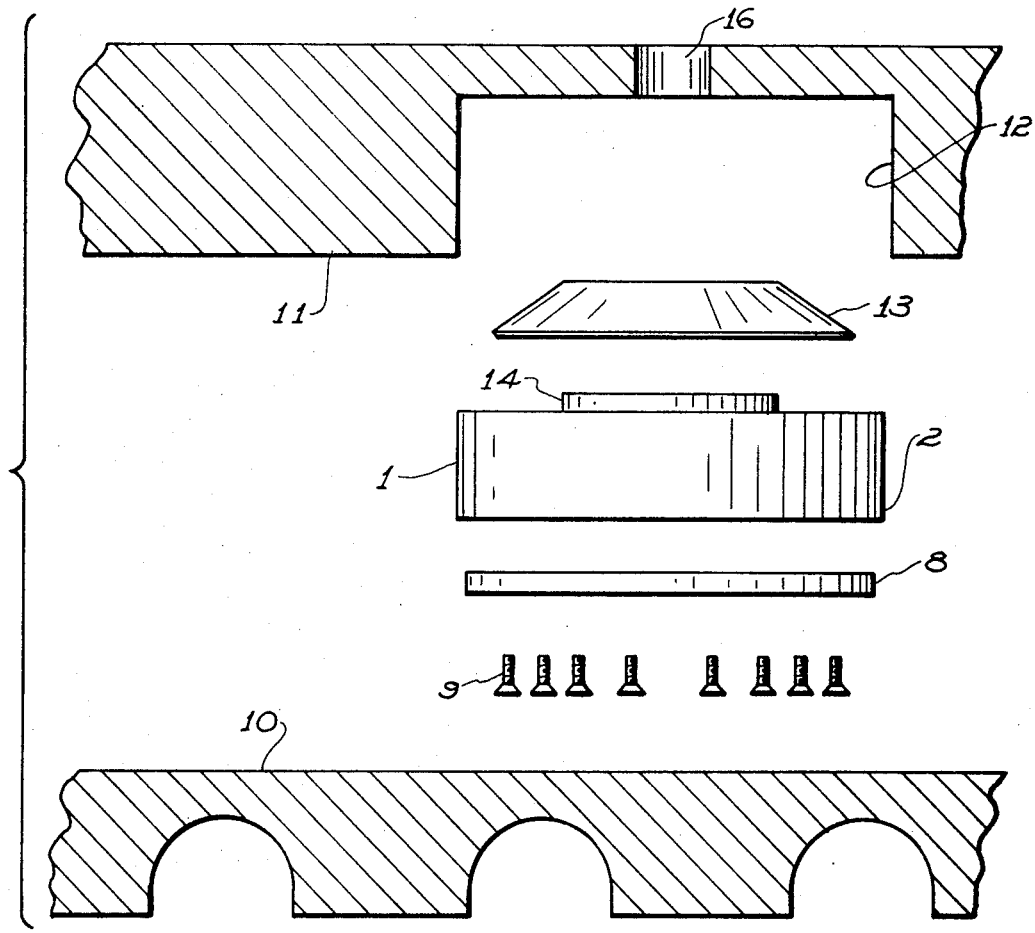
Figure 5:
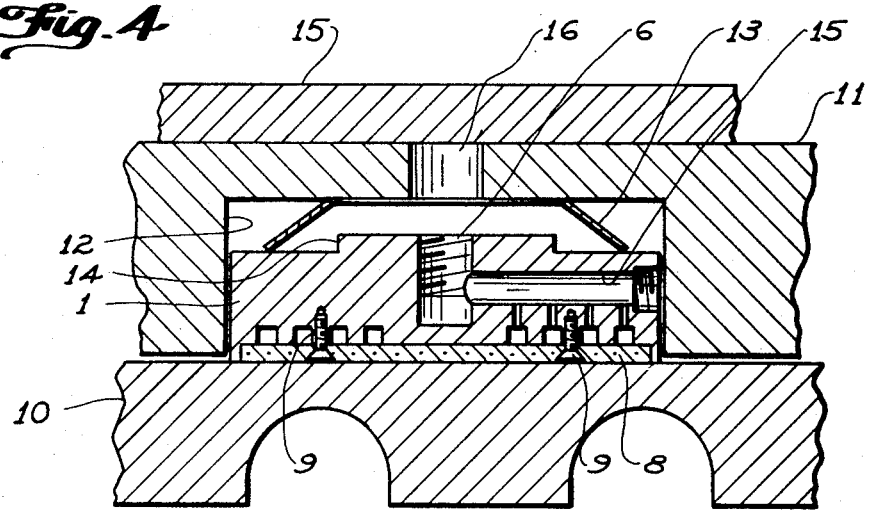

FIG. 4 is an exploded view with parts broken away of my improved bearing including cross sectional views of the tract on which the bearing rides and a plate for supporting or forming part of the load; and FIG. 5 is a cross sectional view of the parts shown in FIG. 4 in their assembled position with the plate for carrying the load and the load arranged over the bearing and being held in spaced relation to the track by resilient means.

Figure 1:
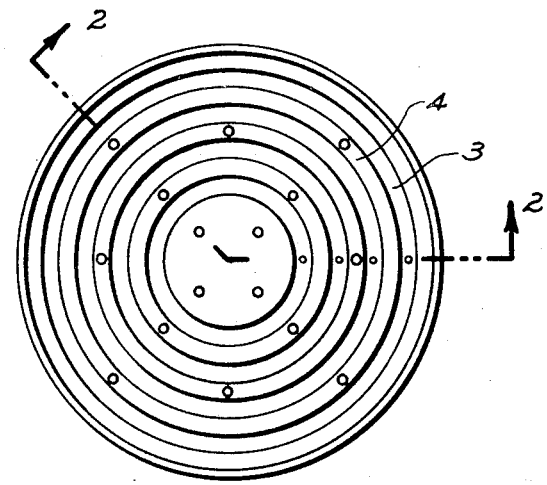
FIG. 1 is a plan view of a portion of a housing.
Figure 2:
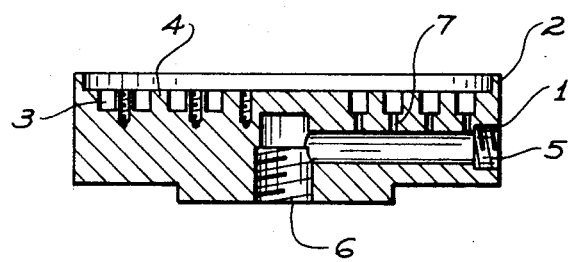
FIG. 2 is a cross sectional view taken on a plane passing through the line 2—2 of FIG. 1.
Figure 3:
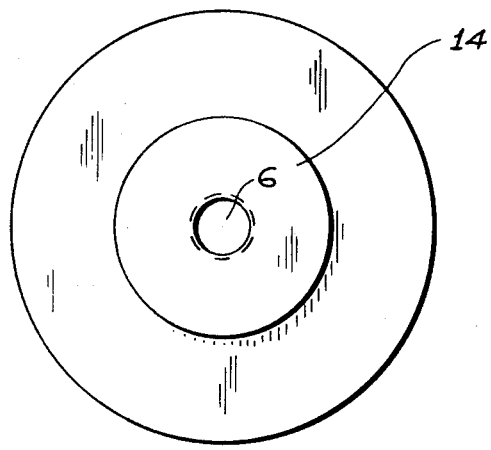
FIG. 3 is a bottom plan view of the housing shown in FIG. 2.

As illustrated in FIGS. 1 to 3, the gas bearing is somewhat similar to that shown in my prior patent with the exception that it may be either rotated or moved in a linear direction. As shown, it consists of a circular housing 1 having an upwardly extending peripheral flange 2 which housing may be formed of any suitable metal, such as steel, aluminum, or bronze, and is trappaned out to form a plurality of circular grooves 3 separated by circular lands or ribs 4, each of which grooves communicates with tapped openings 5 and 6 through a narrow opening 7. A gas, such as air, may be supplied to the circular grooves from either or both of the tapped openings 5 and 6. When the opening 5 is obstructed by the load plate as shown in FIG. 5, however, that opening may be closed with a threaded plug or closure.

In utilizing my improved bearing shown in FIGS. 1 to 3, it is inverted as shown in FIGS. 4 and 5 and a porous plate 8 is arranged within the peripheral flange 2 of the housing and covers the grooves and lands 3 and 4 and is secured to the housing by suitable means, such as screws 9, which extend through the porous plate and the lands and terminate within the housing.

As shown, the heads of the screws are countersunk so as not to interfere with the linear or circular motion of the bearing over a base plate 10 which base plate may be formed of any snitable smooth material, such as a rail, or granite.

While the porous plate may be formed of any suitable material affording sufficient feed therethrough to provide and sustain a substantially uniform film between the plate 8 and the base plate 10 upon which it is movable, it preferably is composed of a commercially available material which consists of a body composed of copper spheres of approximately 100 mesh and of substantially uniform size which are encapsulated with sintered tin particles. In preparing the porous plate 8, the spherically-shaped copper particles and the tin particles which are of approximately 200 mesh are first pressed into a unitary structure and sufficient heat is applied to sinter the tin. A temperature of approximately 1,535° Fahrenheit may be used. The temperature, however, should not be sufficient to liquefy the copper. The copper therefore retains its spherical shape and is encapsulated with sintered tin particles to form gas restrictive pores in which a gas passing through the plate meets its maximum resistance which is evidenced by a substantial pressure drop. After the gas passes outwardly through the gas restrictive pores, it expands to form a thin non-turbulent film which lies in close proximity to the outside surface of the porous plate 8.

In preparing plate 8, the small copper spheres preferably constitute the major proportion of the plate and while I do not desire to be limited to any particular proportions, the copper sphere may be present in an amount ranging from approximately 60 percent to 90 percent and the tin in proportions ranging from approximately 10 percent to 40 percent. For instance, the porous plate 8 may be composed of approximately 90 percent copper spheres and 10 percent of sintered tin which encapsulates the copper spheres to provide venturi-shaped restrictive pores through which the gas passes.

To properly supply the porous metal plate with a sufficient amount of gas, the construction should be of a nature to allow the pressure head to be uniform at the working surface. To obtain this uniform head, the normal linear wall thickness of the plate 8 should be in keeping with that which is required to support the static or at rest load at the working surface. Having thus established the lateral wall thickness of plate 8, this linear measurement should constitute the width of both the grooves and the ribs or lands 4. As shown the depth of the grooves 3 should be approximately one-half of the width of a groove. With such an arrangement, a gas, such as air, flowing from tapped openings 5 or 6 is first restricted by the orifices in the plate 8 and then expands to form a thin nonturbulent uniform film between the plate 8 and the flat base plate 10.

In practicing my invention, the housing 1 of the bearing is preferably circular and may vary from approximately one-fourth inch in diameter to the requirement of the load in relation to the available air supply although if desired two or more circular bearings may be used in tandem to support larger loads which are to be moved in a linear direction.

The bearing is particularly adapted to convey loads in a linearly or rotatable direction to a fixture in which the load may be held in place and work performed thereon without removing it from the bearing. For this purpose, the load may consist of a work plate or table 11 forming part of the work or a plate on which the work is carried and is provided with a counter bore 12 for receiving the bearing.

In accordance with my invention the bearing is capable of carrying the load when the load rests upon the bearing without any work being done thereon in which case, the portion of the work plate adjacent its counter bore may be in the position shown in FIG. 5. To prevent collapse of the bearing, however, when work is being performed on the load forming part of the work plate or being carried by the work plate, such as shearing, stamping, or punching, the work plate is spaced from the upper wall of the bearing by resilient means. The resilient means may be of any suitable type, As shown in FIGS. 4 and 5, it is in the form of a Belleville washer 13 which is of the shape of the frustrum of a cone with upper and lower openings, the lower portion of which washer surrounds the boss 14 on the bearing.

To enable the table 12 and the work thereon to be moved with the gas bearing, the resilient means is strong enough to maintain the portion of the work table which surrounds the counter bore above the base plate. When work is to be performed on the load which may, for example, be a comparatively heavy metal member, such as a jig or a boring mill, together with a work table for carrying such loads, the weight of the load forces the Belleville washer downwardly to such an extent that the lower portion of the work table adjacent its counter bore engages the base plate. The table 11 for supporting the work and the resilient means extending between the work plate and the bearing, however, prevent the load from crushing the bearing and this is particularly true with respect to the porous plate. After the work is performed, the load may be released from the fixture and moved to any desired position. As shown in the drawings, the work piece may be in the form of a plate for carrying a load 15, such as a casting or forging, as shown in FIG. 5 or which forms part of the load, and is provided with an opening 16 therein arranged in alignment with the tapped opening 6 in the bearing so that a gas may be introduced through the socket 6 and into a plenum chamber which as shown is in the form of a channel 15 to the narrow openings and grooves 3 and then through the porous plate 8 to form a thin film between the porous plate and the base plate 10.

What is claimed is:

1. A gas bearing including a housing having a cavity therein and a peripheral flange surrounding the cavity, means providing a plurality of spaced grooves within the cavity which are separated by lands, a porous plate arranged within said cavity which engages said lands and covers said grooves, means for securing said porous plate to said housing, a base plate upon which the porous plate rests, means whereby a gas may be passed into said housing which passes through said porous plate and which forms a bearing between said porous plate and the base plate, a load including a work plate to be moved which work plate has a counter bore surrounding said bearing and resilient means interposed between the top of said bearing and the work plate that has sufficient strength to maintain the work plate in spaced relation to said base plate so that the bearing may be moved to a desired position when the load is thereon.

2. A gas bearing as defined in claim 1 in which the load when worked upon has sufficient weight to move the portions of the work plate surrounding the bearing into engagement with said base plate to thereby prevent movement of the bearing upon the base plate while work is being performed upon the load and said resilient means having sufficient strength to prevent damage to the bearing while work is being performed upon the load.

3. A bearing as defined in claim 1 in which the bearing has an upper boss thereon, a plenum chamber therein, and a socket passing through said boss and communicating with said plenum chamber, and said work plate having an aperture therein which is in alignment with the socket in said bearing so that gas may be passed through said opening and socket into the plenum chamber of said bearing, and the resilient means is a Bellesville washer having upper and lower openings therein with its lower end portion surrounding said boss and its upper end portion engaging the lower face of the upper wall of the counter bore of the work plate and surrounding the opening in the work plate.

4. A gas bearing as defined in claim 1 in which the bearing is circular in shape so that it may be moved either in a linear direction or rotated in a circular direction.

5. A gas bearing as defined in claim 1 in which the grooves and lands in said housing are of substantially the same width as the thickness of the porous plate.

* * * * *